United States Patent [19]
Hilgers

[11] 3,759,535
[45] Sept. 18, 1973

[54] CHUCK WITH INDIVIDUAL JAW COMPENSATION

[75] Inventor: Howard M. Hilgers, Morton, (Fazewell County), Ill.

[73] Assignee: Production Technology Inc., Peoria, Ill.

[22] Filed: Dec. 27, 1971

[21] Appl. No.: 212,547

[52] U.S. Cl. .................. 279/1 J, 279/17, 279/60, 279/123
[51] Int. Cl. ........................................ B23b 31/12
[58] Field of Search ...................... 279/1 J, 60, 17, 279/123

[56] References Cited
UNITED STATES PATENTS
3,633,929   1/1972   Morawski et al. ................ 279/1 J Primary Examiner—Francis S. Husar
Attorney—Donald C. Feix et al.

[57] ABSTRACT

A machine tool chuck includes a chuck body which supports a plurality of jaws having semi-cylindrical mounting portions and correspondingly formed jaw seating ramps within the chuck body to allow the chuck jaws to swivel within their seating ramps about their respective longitudinal axes. The ability to swivel compensates for roughness or irregularities on the workpiece clamping surfaces. A jaw actuating member interconnects the jaws for selective radial contraction and expansion; and upon the imposition of an external inwardly directed force upon the workpiece, the jaws are automatically drawn into more tightly clamping relation to the workpiece.

3 Claims, 5 Drawing Figures

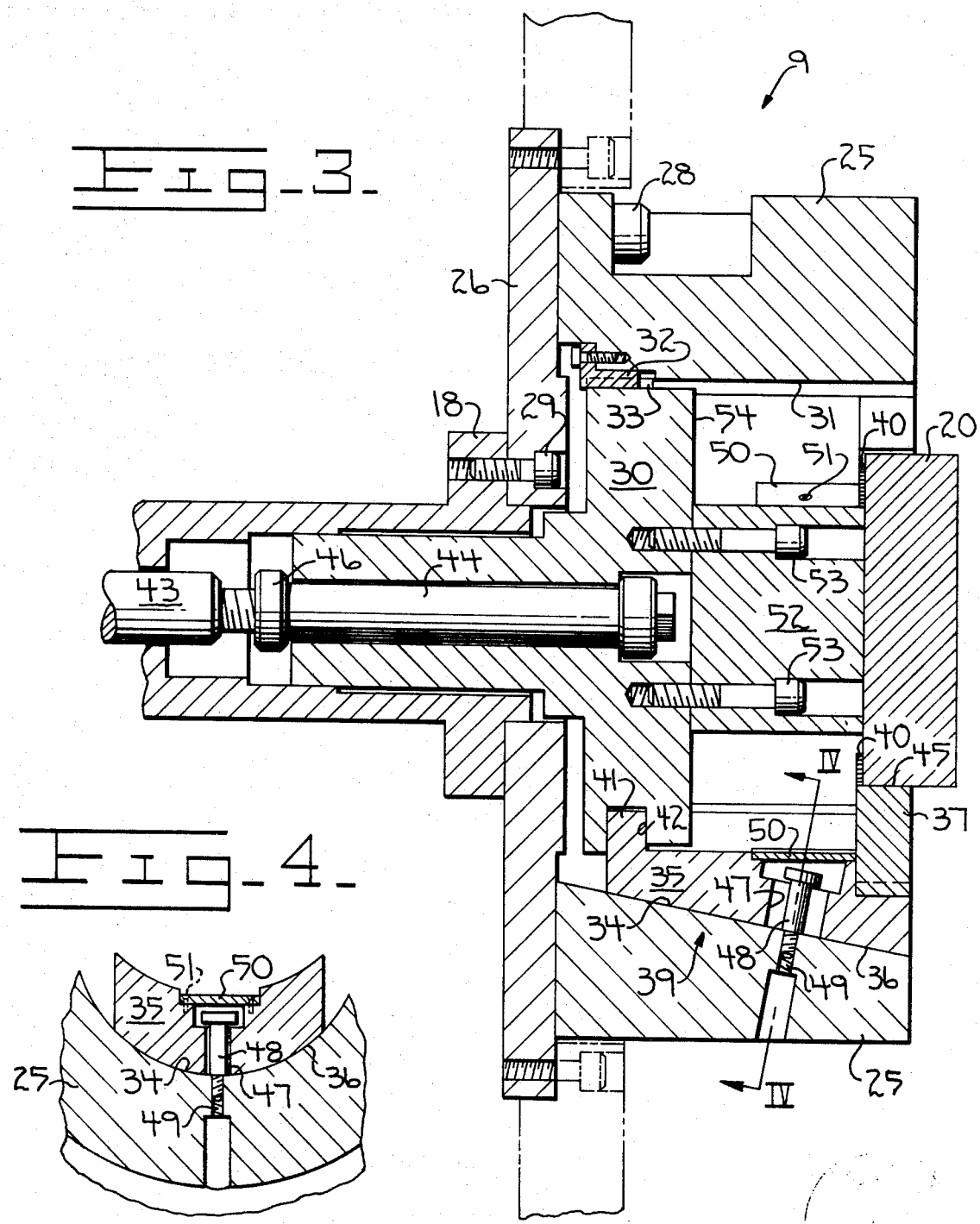

CHUCK WITH INDIVIDUAL JAW COMPENSATION

BACKGROUND OF THE INVENTION

This invention relates to jaw chucks which are designed for use on a machine tool for securely holding a workpiece on which a work operation is to be performed. More particularly, this invention relates to a chuck having a plurality of individual jaws which are activated simultaneously, but which can also act individually for clamping a workpiece within the chuck.

The majority of machine tool chucks fall within two major categories, collet type and jaw type.

The collet type is only adapted for holding workpieces which have a realtively smooth exterior surface. However such a collet type is limited in clamping workpieces which are not closely dimensioned to the size of the collet. Additionally, the collet type chuck is generally unacceptable for securely holding workpieces with rough or uneven surfaces.

The jaw type chuck is divided into two main groups, a manually operated type and a power operated type.

The manually operated jaw chuck is unacceptable in a high production shop operation due to the length of time required to tighten each of the jaws individually.

The power operated jaw chuck is more widely used in production operations since it conserves time and is easily operated. Moreover, the power operated jaw chuck is somewhat of the self-compensating type wherein the plurality of jaws are simultaneously moved toward and away from the workpiece by the power operated mechanism. Each of the jaws in such a chuck is generally guided in its axial direction by a groove, a slot, or some type of key.

An inherent disadvantage of such a chuck is that when an uneven or not perfectly round workpiece is to be held, not all of the jaws will contact the workpiece. Even if all of the jaws should contact the workpiece, many of them have only one point contact between the jaws and the workpiece since the jaws are all activated together and there is no individual co-action between an individual jaw and the workpiece.

The subject chuck is particularly useful with a friction welding machine although it is not limited to such use.

In friction welding operations, the workpiece must be securely held against axial, radial and rotary motion in order to guarantee a good weld assembly. Additionally, the high torque forces developed during the friction welding operation must be restrained by the chuck in order to prevent the workpiece from slipping or turning within the chuck.

The present chuck assembly provides a drawbar assembly for intially moving the jaws into contact with the workpiece by means of a jaw actuating member. It is further arranged such that application of an axial thrust force to the workpiece will engage the workpiece with the jaw actuating member to move the jaws farther into the chuck and thereby will increase the clamping force of the jaws upon the workpiece.

Most prior art chuck assemblies do not provide adequate holding power to restrain a large torque force developed during a work operation. Additionally, the prior art chuck assemblies are generally inadequate in applications of the type contemplated for the subject chuck because they fail to provide adequate contact with the workpiece or fail to provide adequate radial motion of the jaws in order to insure adequate contact with the workpiece.

SUMMARY AND OBJECTS OF THIS INVENTION

Accordingly, it is an object of the present invention to construct an improved chuck assembly which will securely hold a workpiece having a relatively rough or non-uniform peripheral surface.

Another object of the present invention is to include a plurality of self-compensating jaws. The jaws are initially power actuated into engagement with a workpiece and may be urged into more tightly clamping engagement upon the imposition of an axially applied load against the workpiece.

Another object of the present invention is to permit each jaw to independently swivel to insure maximum surface contact between the jaws and the workpiece.

Other objects and advantages of the present invention will become more readily apparent upon reference to the accompanying drawings and following description.

BRIEF DESCRIPTION OF THE DRAWINGS

FIG. 3 is a transverse vertical section through the chuck assembly taken along line III—III of FIG. 2.

FIG. 4 is a transverse vertical section through a portion of the chuck assembly taken along the line IV—IV of FIG. 3.

FIG. 5 is an isometric view partially in section of a portion of the chuck body showing one of the chuck jaw seating ramps.

DESCRIPTION OF THE PREFERRED EMBODIMENT

Figure 1:
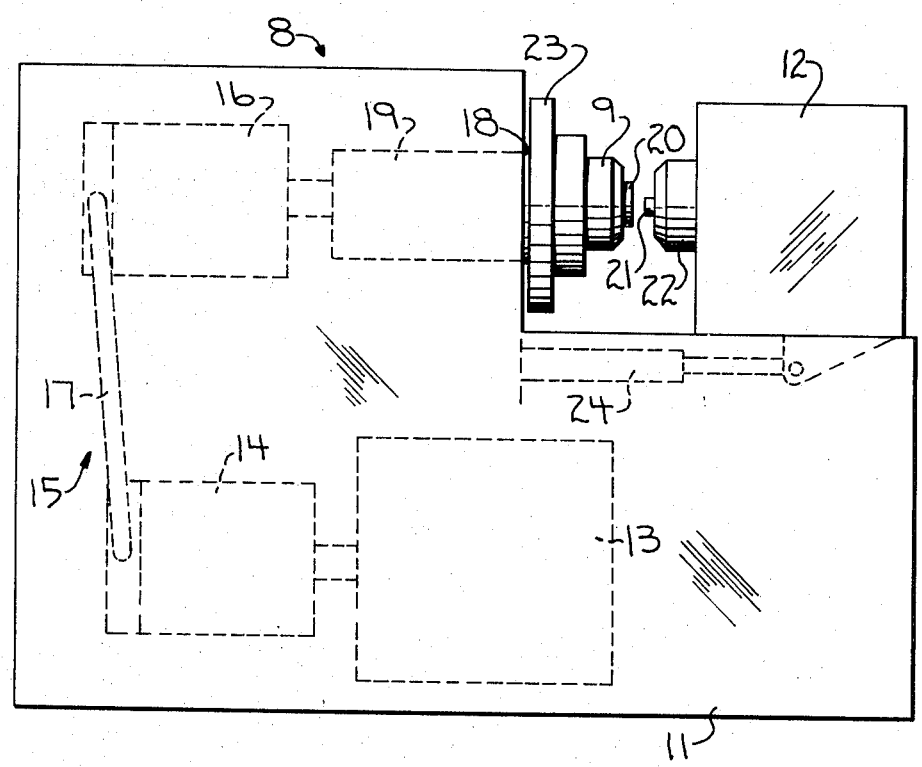
FIG. 1 is a side elevation of a chuck embodying the principles of the present invention incorporated into a rotary spindle type machine such as that illustrated for friction welding a pair of workpieces.

A chuck 9 embodying the principles of the present invention is illustrated in FIG. 1 and is shown mounted on a friction welding machine 8 which forms an exemplary setting for the chuck.

The machine 8 includes a frame 11 which supports the tailstock fixture 12 and houses several of the machine elements.

These elements include an electric motor 13 which powers a hydrostatic transmission 15.

The transmission which is used to rotate the spindle 18 mounted in a bearing housing 19, comprises a hydraulic pump 14, a hydraulic motor 16, and a manifold 17. The transmission can also be used to effectively disconnect the spindle from the electric motor.

The chuck 9 of the present invention is mounted for rotation upon the spindle 18, and a tailstock chuck 22 is mounted on the tailstock assembly 12.

One or more inertia weights 23 are mounted upon the spindle for providing the necessary welding energy in accordance with well known inertia welding techniques.

The tailstock assembly 12 and associated tailstock chuck 22 are mounted for axial movement on the machine frame under the control of a load cylinder 24.

A pressure control circuit, not shown, regulates the pressure in the load cylinder and thus determines the force with which a first workpiece 20, held in chuck 9, and a second workpiece 21, held in tailstock chuck 22, are axially engaged.

Figure 2:
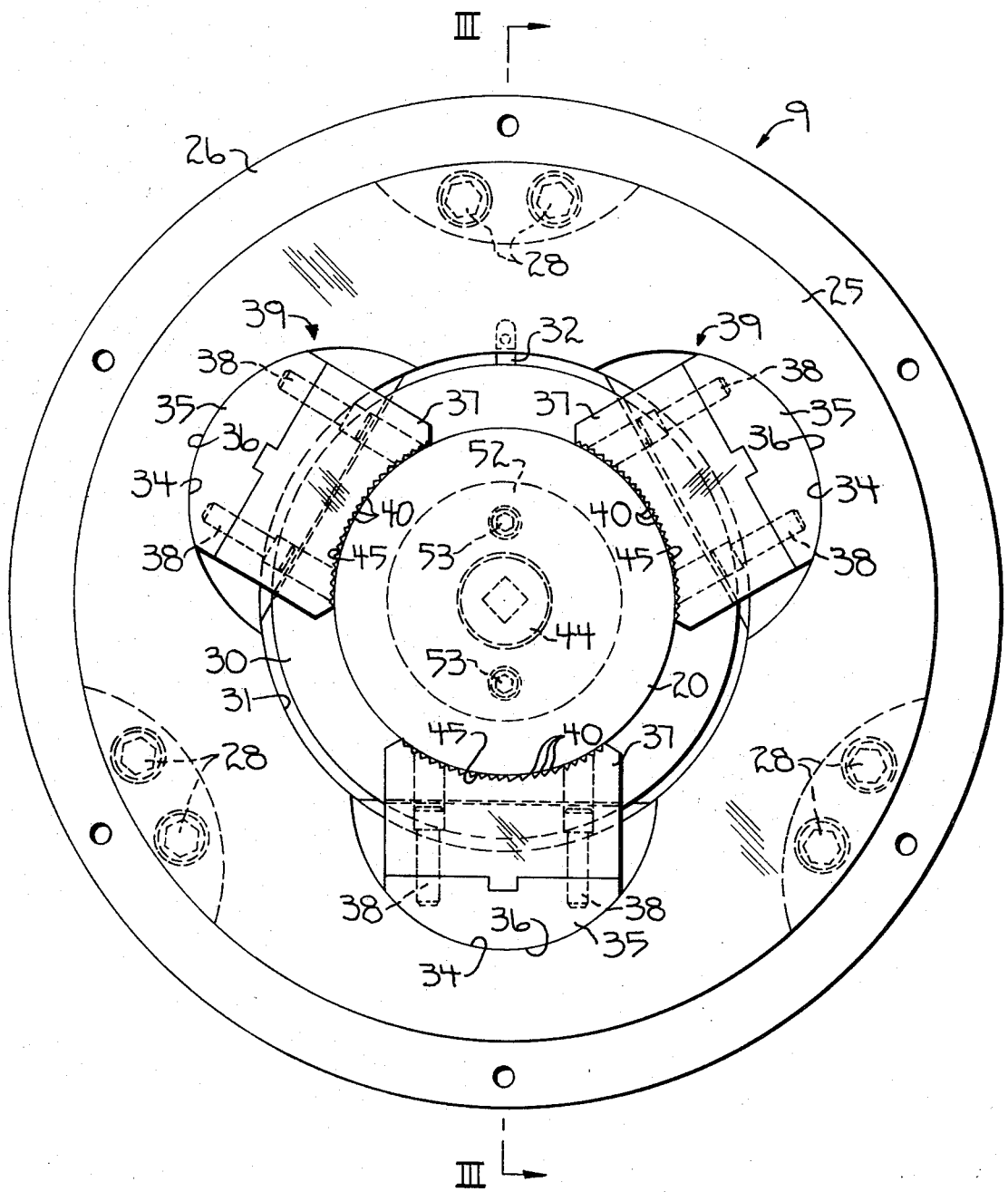
FIG. 2 is a somewhat enlarged front elevation of the chuck assembly of FIG. 1.

The chuck of the present invention is best known in FIGS. 2 and 3 and includes a chuck body 25 which is fastened to a mounting plate 26 by a plurality of cap screws 28.

The mounting plate is fastened to the spindle 18 of the machine 8 by a plurality of cap screws, one of which is shown at 29.

An actuator block 30 is housed within a central circular bore 31 in the chuck body and is fixed against relative rotation therewith by an elongated key 32 situated within a keyway 33.

The chuck body 25 contains a plurality of semicylindrical jaw seating recesses or ramps 34 disposed in substantially equally circumferentially spaced relation to the central bore 31.

One of the cylindrical jaw seating ramps is best shown in FIG. 5.

Each of the ramps contains a chuck jaw assembly 39 having a mounting portion 35 and a gripping portion 37.

The mounting portion has an elongated mounting surface 36 which matches the mating surface of its associated ramp.

The gripping portions are individually mounted on the mounting portions 35 by means of cap screws 38. The gripping portions are provided in various sizes in order to increase the range of workpieces which can be clamped within the chuck 9. Each of the gripping portions has a plurality of serrations or teeth 40 which contact the surface of the workpiece and indent or bite into the surface in order to securely hold the workpiece.

The first workpiece 20, disposed within the chuck 9, is shown as a circular plate although the chuck is not limited to holding this particular configuration of workpiece.

A tang or flange 41 on each of the mounting portions individually slidably fits into one of a plurality of spaced, chordal slots 42 in the actuator block 30. Due to this interconnection, all of the chuck jaws are moved inwardly or outwardly of the chuck body as the actuator block reciprocates in the bore 31.

Reciprocal motion of the actuator block 30 is provided by a power operated drawbar 43 in the spindle 18 of the inertia welding machine 8. An elongated threaded shaft 44 extends through the actuator block 30 and fastens the actuator clock to the drawbar 43. An adjustable nut 46 is threaded onto one end of the shaft and contacts the actuator block 30 as the drawbar 43 is moved to the right, as viewed in FIG. 3, to force the actuator block outwardly of the chuck for unclamping the chuck jaw assemblies 39 from the first workpiece 20.

The mounting portion 35 of each of the chuck jaw assemblies 39 has an elongated substantially rectangular slot 47 extended therethrough, as best shown in FIGS. 3 and 4.

A threaded shoulder bolt 48 extends through the slot and engages a threaded hole 49 in the chuck body 25. The shoulder bolts serve to retain the mounting portions in place while still allowing them a limited amount of lateral and axial motion.

A plate 50 is held in covering relation to each of the elongated slots by screws 51 and serves to keep dirt and other foreign objects away from the contact surfaces 34 and 36 of the chuck body and mounting portions.

A backup block 52 is fastened by a plurality of cap screws 53 to the forward end 54 of the actuator block 30. The first workpiece 20 rests against the backup block and the load applied to the workpiece during the welding operation is transferred through the backup block to the actuator block 30. Depending upon the size and type of workpiece, various sizes and shapes of backup blocks can be used. In some cases, the workpiece itself can rest against the forward end of the actuator block and no backup member is needed.

OPERATION

While the operation of the present invention is believed clearly apparent from the foregoing description, further amplification will subsequently be made in the following brief summary of such operation.

The chuck 9 is properly fastened to the spindle 18 of the friction welding machine 8 in the manner described.

The first workpiece 20 is inserted into the bore 31 of the chuck and is positioned to rest against either the backup member 52 or against the actuator block 30 as may be required by the particular type of workpiece employed.

The drawbar 43 is then actuated, causing the shaft 44, actuator block 30, and backup member 52 to move to the left as viewed in FIG. 1 of the drawings. During such movement the chuck jaw assemblies 39 move farther into the bore 31 of the chuck. Since the surface 36 of the mounting portions are in contact with the ramp surface 34 of the chuck body, the chuck jaw assemblies move radially inwardly toward the first workpiece 20 as the jaw assemblies move upwardly upon the ramp surfaces 34. Since the gripping portions 37 are sized according to the size of the workpiece, the jaw assemblies are required to move only a relatively short distance inwardly of the chuck before contacting the exterior surface of the workpiece. Due to the force applied by the drawbar, the teeth 40 on the gripping portions 37 engage the surface of the workpiece in tightly clamping relation. The teeth 40 are arranged on generally arcuate surfaces 45 of the gripping portions 37. The arcuate surfaces will approximate the shape of the peripheral surface of the workpiece 20 and will normally assume a concentric relationship with the workpiece.

As described, the first workpiece 20 may have a rough surface or the jaws may be skewed in nonconcentric relation to the workpiece during its insertion into the chuck 9. When this occurs the jaws 35 of the chuck are permitted to automatically swivel slightly in the appropriate direction by virtue of the cylindrical jaw seating ramps 34 in the chuck body and the matching mounting surface 36 of the chuck jaw mounting portions. Enough swiveling motion is allowed for each of the chuck jaw mounting portions 35 to individually compensate for rough surfaces on the workpiece and to individually align the gripping portion according to the configuration of the workpiece. In this way, a relatively large clamping surface is provided between the workpiece and each of the gripping portions 37. Should the workpiece surface be extremely rough or uneven, the chuck jaw gripping portion will, in most cases, contact the workpiece surface in at least two locations.

Once the chuck jaw gripping portions 37 have firmly clamped onto the surface of the first workpiece 20, the second workpiece 21 is firmly clamped into the tailstock chuck 22. The spindle 18 of the welding machine is rotated to a predetermined velocity by means of the electric motor 13, the hydraulic pump 14, and the hydraulic motor 16.

When the spindle, chuck and any coupled flywheels have reached the predetermined welding velocity, the spindle is then decoupled or otherwise disconnected from the power source.

The load cylinder 24 is then activated to move the tailstock assembly 12 and the second workpiece 21 toward the rotating spindle and the first workpiece.

The axially applied thrust force is transferred from the second workpiece 21 into the first workpiece 20 and from there through the backup member 52 into the actuating block 30. This causes the actuator block 30 to move farther into the bore 31 which will likewise move the chuck jaw assemblies 39 farther up the cylindrical ramp surfaces 34. This increases the clamping force applied to the workpiece 20 by the gripping portions 37.

In this way, the original clamping force applied by the drawbar 43 is supplemented and increased by the axially applied thrust force.

The first and second workpieces are welded together due to frictionally developed heat by the conversion of the stored energy and the axially applied thrust force.

The welding operation is completed as the rotating splindle, flywheels, and chuck come to a rest.

The tailstock chuck 22 is then released, and the load cylinder 24 is activated to move the tailstock assembly 12 away from the spindle 18.

The drawbar 43 is then activated to move the shaft 44 to the right as viewed in FIG. 3 of the drawings. At such time, adjusting nut 46 contacts the actuator block 30 and forces the actuator block outwardly of the bore 31. Since the chuck jaw assemblies 39 are interconnected with the actuator block 30 by means of flanges 41 and slots 42, the jaw assemblies are moved down the cylindrical ramp surfaces 34 and the gripping portions 37 are released from the first workpiece 20.

The completed weldment is removed from the chuck 9 to permit unrestricted subsequent loading.

In view of the foregoing, it is readily apparent that the structure of the present invention provides an improved chuck for securely clamping and holding a workpiece. While the invention has been described and shown with particular reference to the preferred embodiment, it will be apparent that variations might be possible that would fall within the scope of the present invention which is not intended to be limited, except as defined in the following claims.

What is claimed is:

1. A chuck for gripping a workpiece comprising:
a hollow chuck body having an elongated transversely arcuate and semi-cylindrical jaw constraining recess disposed in radially inwardly converging relation within the body,
a workpiece gripping jaw slidably disposed within said recess for swiveling movement on its respective longitudinal axis in conforming relation to surface irregularities on such a workpiece as the jaw moves radially inwardly toward the workpiece in response to the imposition of an axially applied force sliding it inwardly of the body along its inwardly converging recess, said jaw including a semicylindrical mounting portion disposed in precisely conforming slidable relation within its recess of the body, and
retainer means permitting said swiveling and sliding movement of the jaw within its recess in the body but precluding complete separation of the jaw therefrom, said retainer means including an elongated slot in said jaws, and an elongated fastener mounted within said body in substantially radially inwardly extended relation through said slot.

2. The chuck of claim 1 including jaw actuator means slidably interconnecting said jaw for movement within the body.

3. The chuck of claim 2 wherein said actuator means comprises a cylindrical block axially reciprocably mounted within the body and having a circumferential radially inwardly chordal slot and said jaw including a tang portion slidably extended into said slot to permit relative radial movement of the jaw with respect to the actuator block for maintaining the connection therebetween throughout its entire range of reciprocable movement.

* * * * *